US011407902B2

(12) United States Patent
Keese et al.

(10) Patent No.: US 11,407,902 B2
(45) Date of Patent: *Aug. 9, 2022

(54) ZWITTERIONIC POLYMER-CONTAINING COMPOSITIONS FOR COATING METALLIC SURFACES, METHODS, AND ARTICLES

(71) Applicant: 3M INNOVATIVE PROPERTIES COMPANY, St. Paul, MN (US)

(72) Inventors: Anna Keese, Düsseldorf (DE); Christoph T. Schuell, Neuss (DE); Christiane Strerath, Düsseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 957 days.

This patent is subject to a terminal disclaimer.

(21) Appl. No.: 16/086,219

(22) PCT Filed: Mar. 15, 2017

(86) PCT No.: PCT/US2017/022424
§ 371 (c)(1),
(2) Date: Sep. 18, 2018

(87) PCT Pub. No.: WO2017/160918
PCT Pub. Date: Sep. 21, 2017

(65) Prior Publication Data
US 2020/0291240 A1    Sep. 17, 2020

Related U.S. Application Data

(60) Provisional application No. 62/310,331, filed on Mar. 18, 2016.

(51) Int. Cl.
| | |
|---|---|
| *C11D 1/88* | (2006.01) |
| *C11D 3/08* | (2006.01) |
| *C11D 3/37* | (2006.01) |
| *C09D 1/04* | (2006.01) |
| *C09D 133/14* | (2006.01) |
| *C11D 11/00* | (2006.01) |

(52) U.S. Cl.
CPC ............. *C09D 1/04* (2013.01); *C09D 133/14* (2013.01); *C11D 3/08* (2013.01); *C11D 3/3796* (2013.01); *C11D 11/0029* (2013.01)

(58) Field of Classification Search
CPC .... C11D 1/88; C11D 3/08; C11D 3/37; C11D 3/3796; C09D 1/04; C09D 133/14
See application file for complete search history.

(56) References Cited

U.S. PATENT DOCUMENTS

| | | |
|---|---|---|
| 3,459,500 A | 8/1969 | Segura |
| 4,013,475 A | 3/1977 | Liebowitz |
| 4,152,165 A | 5/1979 | Langager |
| 4,338,377 A | 7/1982 | Beck |
| 4,816,333 A | 3/1989 | Lange |
| 4,830,773 A | 5/1989 | Olson |
| 5,244,780 A | 9/1993 | Strobel |
| 5,936,703 A | 8/1999 | Miyazaki |
| 6,040,053 A | 3/2000 | Scholz |
| 6,156,108 A | 12/2000 | Wachowiak, Jr. |
| 6,569,261 B1 | 5/2003 | Aubay |
| 6,703,358 B1 | 3/2004 | Aubay |
| 6,916,773 B2 | 7/2005 | Griese |
| 6,955,834 B2 | 10/2005 | Rohrbaugh |
| 6,972,277 B2 | 12/2005 | Dietz |
| 7,232,479 B2 | 6/2007 | Poulet |
| 8,088,724 B2 | 1/2012 | Iverson |
| 8,222,196 B2 | 7/2012 | Smith |
| 8,354,368 B2 | 1/2013 | Schunicht |
| 8,546,317 B2 | 10/2013 | Mertens |
| 8,680,038 B2 | 3/2014 | Balastre |
| 8,772,215 B2 | 7/2014 | Ryther |
| 10,323,161 B2 * | 6/2019 | Riddle ................. C09D 183/08 |
| 2006/0217286 A1 | 9/2006 | Geoffroy |
| 2007/0116968 A1 | 5/2007 | Dierdorf |
| 2007/0213251 A1 * | 9/2007 | Aubay ............... C11D 17/0078 510/504 |
| 2009/0197791 A1 | 8/2009 | Balastre |
| 2010/0317559 A1 | 12/2010 | Ryther |
| 2011/0300093 A1 | 12/2011 | Bendejacq |
| 2012/0029141 A1 | 2/2012 | Jing |
| 2012/0273000 A1 | 11/2012 | Jing |
| 2012/0295829 A1 | 11/2012 | Peitersen |
| 2013/0023458 A1 | 1/2013 | Hodge |
| 2014/0060583 A1 | 3/2014 | Riddle |

(Continued)

FOREIGN PATENT DOCUMENTS

| | | |
|---|---|---|
| CN | 102655953 A | 9/2012 |
| JP | 11-005951 | 1/1999 |

(Continued)

OTHER PUBLICATIONS

Bragg, "The Form Birefringence of Macromolecules", Acta Crystallographica, 1953, vol. 6, pp. 865-867.
Griffin, "Calculation of HLB Values of Non-Ionic Surfactants," Journal of the Society of Cosmetic Chemists, 1954, vol. 5, pp. 249-256.
Kirk-Othmer, Encyclopedia of Chemical Technology, 900-912, (1979).
International Search Report for PCT International Application No. PCT/US2017/022424, dated May 29, 2017, 4 pages.

*Primary Examiner* — Brian P Mruk
(74) *Attorney, Agent, or Firm* — Vincent Pham

(57) ABSTRACT

The present disclosure is directed to compositions and methods for coating, particularly protecting and optionally cleaning, metallic surfaces, and articles containing such surfaces; wherein the compositions include a zwitterionic polymer including pendant zwitterionic moieties, an inorganic silicate, and water.

19 Claims, No Drawings

(56) References Cited

U.S. PATENT DOCUMENTS

2015/0166935 A1 6/2015 Gardner, Jr.
2016/0115342 A1 4/2016 Kawakami

FOREIGN PATENT DOCUMENTS

| WO | WO 2007-143344 | 12/2007 | | |
|----|----------------|---------|---|---|
| WO | WO 2007-146680 | 12/2007 | | |
| WO | WO 2009-119690 | 10/2009 | | |
| WO | WO 2010-060006 | 5/2010 | | |
| WO | WO 2010-063763 | 6/2010 | | |
| WO | WO 2011-163175 | 12/2011 | | |
| WO | WO 2013-181030 | 12/2013 | | |
| WO | WO 2014-036448 | 3/2014 | | |
| WO | WO 2014-099448 | 6/2014 | | |
| WO | WO 2016/044082 | * 3/2016 | ........... | C09D 183/02 |
| WO | WO 2016-044082 | 3/2016 | | |
| WO | WO 2017-142802 | 8/2017 | | |

* cited by examiner

ZWITTERIONIC POLYMER-CONTAINING COMPOSITIONS FOR COATING METALLIC SURFACES, METHODS, AND ARTICLES

CROSS REFERENCE TO RELATED APPLICATIONS

This application is a national stage filing under 35 U.S.C. 371 of PCT/US2017/022424, filed Mar. 15, 2017, which claims the benefit of Provisional Application No. 62/310,331, filed Mar. 18, 2016, the disclosure of which is incorporated by reference in their entirety herein.

BACKGROUND

Stainless steel is ubiquitous in commercial kitchens, home kitchens, office buildings, airports, and various other public spaces. The majority of cleaning products designed for use on stainless steel surfaces are both cleaners and polishers (including mixtures of mineral oil and water, or solvent and mineral oil). The oil in these products helps hide fingerprints by blending/covering them with the applied mineral oil. The oily layer provides the substrate a shiny appearance.

Stainless steel products that utilize this clean and polish approach typically suffer from many drawbacks, including: streaking (e.g., it is difficult to get a streak-free shine); difficult to "spot clean" a portion of the surface (e.g., users typically have to clean an entire area to maintain a uniform oil layer); the product dries slowly, and the appearance changes during drying; attraction to dirt (e.g., oiled surfaces collect lint and dust easily); oil build-up (e.g., mineral oil left on surfaces can accumulate and is difficult to remove); and the inability to cut tough stains commonly found in restrooms.

Thus, there is a need for compositions that can coat, and more particularly protect, and optionally clean and protect, stainless steel surfaces, and other metallic surfaces.

SUMMARY

The present disclosure addresses this challenge. The present disclosure is directed to compositions and methods for coating, and more particularly protecting, and optionally cleaning and protecting, metallic surfaces, and also to articles containing the resultant coated metallic surfaces.

Advantageously, in certain embodiments, coating compositions of the present disclosure are used to protect metallic surfaces, thereby making them easier to subsequently clean. Such coating compositions include a zwitterionic polymer, an inorganic silicate, and water.

In certain embodiments, coating compositions of the present disclosure are used to clean and protect a metallic surface (in one step). Such coating compositions include a zwitterionic polymer, an inorganic silicate, water, and a surfactant.

The zwitterionic polymer includes pendant zwitterionic moieties. Such polymers are derived from one or more zwitterionic monomers. In some embodiments, the zwitterionic polymer is a homopolymer.

In some embodiments, the inorganic silicate is a lithium silicate.

In one embodiment, the present disclosure provides a method of protecting a metallic surface, the method including: providing a coating composition (that includes a zwitterionic polymer, an inorganic silicate, and water), which may be concentrated or a ready-to-use composition; optionally, diluting the coating composition, if concentrated, to a ready-to-use composition; applying the ready-to-use composition to a metallic surface; and allowing the ready-to-use composition to dry on the metallic surface.

In one embodiment, the present disclosure provides a method of cleaning and protecting a metallic surface having contaminants thereon, the method including: providing a coating composition (that includes a zwitterionic polymer, an inorganic silicate, water, and a surfactant), which may be concentrated or a ready-to-use composition; optionally, diluting the coating composition, if concentrated, to a ready-to-use composition; applying the ready-to-use composition to a metallic surface under conditions effective to remove contaminants from the metallic surface (e.g., such conditions include wiping, scrubbing, etc.); and allowing the ready-to-use composition to dry on the metallic surface.

The present disclosure also provides articles that include a metallic surface.

In one embodiment, an article includes a metallic surface having a coating composition of the present disclosure disposed thereon.

In one embodiment, an article includes a metallic surface having a coating disposed thereon, wherein the coating is applied by a method of the present disclosure.

In one embodiment, the present disclosure provides an article having a metallic surface that includes a hardened coating, wherein the hardened coating is hydrophilic and includes: a zwitterionic polymer, a silicate, and an optional surfactant; wherein the hardened coating is attached to the surface associatively.

Definitions

A coating composition of the present disclosure may be in a "ready-to-use" form or a "concentrated" form. Herein, a "ready-to-use" composition is one that is not diluted before coating or cleaning a surface. In contrast, a "concentrated" composition is one that is diluted before coating or cleaning a surface. Dilutions typically seen are 1:1 to 1:500, wherein 1 part of concentrate is added to 1 part water (or 500 parts water).

In the context of a composition, "solids" or "total solids" refers to the amount of solids, without a liquid carrier, unless specified otherwise.

In the context of a coating, a "hardened" coating refers to one that is dried upon removal of the water and optional organic solvents. The components of the coating form a network of zwitterionic polymer plus silicate(s) that are bonded together chemically and/or physically, including ionic bonding, hydrogen bonding, and/or covalent bonding.

Herein, a "metallic surface" refers to a surface that includes elemental metals or alloys of metals. The term also includes surface oxides of such elemental metal or alloy. This term does not include bulk oxides, such as alumina, silica, etc.

In the context of a surface, a "hydrophilic" surface is one that is wet by aqueous solutions, and does not express whether or not the layer absorbs aqueous solutions. Surfaces on which drops of water or aqueous solutions exhibit an advancing water contact angle of less than 45° are referred to as "hydrophilic" per ASTM D7334-08. Hydrophobic surfaces have a water contact angle of 90° or greater.

In the context of a zwitterionic polymer of the present disclosure, the term "pendant group" is meant to refer to an offshoot, which is neither oligomeric nor polymeric, from a polymeric (backbone) chain.

In the context of a zwitterionic polymer of the present disclosure, the expression "zwitterionic moiety" is meant to designate a moiety including both cationic and anionic groups, or corresponding simultaneously ionizable groups.

The term "alkyl" means a linear or branched, cyclic or acylic, saturated monovalent hydrocarbon. The term "alkylene" means a linear saturated divalent hydrocarbon or a branched saturated divalent hydrocarbon. The term "alkoxy" means an alkyl having a terminal oxygen atom. The term "oxyalkoxy" has essentially the meaning given above for alkoxy except that one or more oxygen atoms may be present in the alkyl chain. The term "oxyalkyl" has essentially the meaning given above for alkyl except that one or more oxygen heteroatoms may be present in the alkyl chain, these heteroatoms being separated from each other by at least one carbon. The term "oxyalkylene" has essentially the meaning given above for alkylene except that one or more oxygen heteroatoms may be present in the alkylene chain, these heteroatoms being separated from each other by at least one carbon.

The terms "includes" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. For example, a composition that includes "a" surfactant may include "one or more" surfactants.

As used herein, the term "or" is generally employed in its sense including "and/or" unless the content clearly dictates otherwise. The term "and/or" means one or all of the listed elements or a combination of any two or more of the listed elements.

As used herein, all numbers are assumed to be modified by the term "about" and in certain embodiments by the term "exactly." Notwithstanding that the numerical ranges and parameters setting forth the broad scope of the invention are approximations, the numerical values set forth in the specific examples are reported as precisely as possible. All numerical values, however, inherently contain certain errors necessarily resulting from the standard deviation found in their respective testing measurements.

Also herein, the recitations of numerical ranges by endpoints include all numbers subsumed within that range (e.g., 1 to 5 includes 1, 1.5, 2, 2.75, 3, 3.80, 4, 5, etc.). Herein, "up to" a number (e.g., up to 50) includes the number (e.g., 50).

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure is directed to compositions and methods for coating, more particularly protecting, and optionally cleaning and protecting, metallic surfaces, and articles containing such surfaces, particularly those in a kitchen, for example.

Coating compositions of the present disclosure include a zwitterionic polymer, an inorganic silicate, and water. Depending on the use, compositions of the present disclosure may include one or more optional components, such as a surfactant, an organic solvent, an alkalinity source, a water conditioning agent, a bleaching agent, and other optional additives (e.g., dyes, fragrances, corrosion inhibitors, enzymes, and/or thickeners). In certain embodiments, coating compositions of the present disclosure do not include a non-zwitterionic silane. In certain embodiments, coating compositions of the present disclosure do not include a non-zwitterionic anionic silane.

In certain embodiments, the coating compositions include a surfactant and are useful for cleaning and protecting. In certain embodiments, the coating compositions are nondetergent compositions. Such coating compositions do not include a surfactant and are used for protecting.

In certain embodiments, a coating composition of the present disclosure includes a zwitterionic polymer and an inorganic silicate in a range of weight ratios of at least 10:90, or at least 20:80, or at least 30:70, or at least 40:60. In certain embodiments, a coating composition of the present disclosure includes a zwitterionic polymer and an inorganic silicate in a range of weight ratios of up to 90:10, or up to 80:20, or up to 70:30, or up to 60:40, or up to 50:50, or up to 40:60.

Coating compositions of the present disclosure may be used for coating and protecting a metallic surface (e.g., a metal surface and/or a metal oxide surface). In certain embodiments, they may be used for cleaning and protecting a metallic surface in one step.

Advantageously, when dirt does collect on a metallic surface treated with a coating composition of the present disclosure can be more easily cleaned (e.g., using a simple wet cloth, water wash, or water dipping depending upon the harshness of the grime).

Coating compositions of the present disclosure may be in the form of ready-to-use aqueous compositions or concentrated aqueous compositions. As used herein, the term "aqueous composition" refers to compositions containing water. Such compositions are typically solutions and may employ water as the only solvent or liquid carrier, or they may employ combinations of water and organic solvents such as alcohol and acetone to improve, for example, freeze-thaw stability.

Coating compositions of the present disclosure are preferably applied out of water using a ready-to-use composition to a metallic surface. A concentrated coating composition may need to be diluted, typically with water, to form a ready-to-use coating composition.

In some embodiments, coating compositions (i.e., compositions) of the present disclosure include water in an amount of at least 80 weight percent (wt-%), and often at least 90 wt-%, based on the total weight of a ready-to-use composition.

In some embodiments, compositions of the present disclosure include solids (e.g., the zwitterionic polymer and silicate(s) without their liquid carriers) in an amount of up to 20 wt-%, or up to 10 wt-%, or up to 8 wt-%, or up to 6 wt-%, or up to 4 wt-%, or up to 2 wt-%, or up to 1 wt-%, or up to 0.1 wt-%, or up to 0.001 wt-%, based on the total weight of a ready-to-use composition. A preferred ready-to-use composition includes 2 wt-% solids.

In some embodiments, compositions of the present disclosure include solids (e.g., the zwitterionic polymer and silicate(s) without their liquid carriers) in an amount of greater than 20 wt-%, or greater than 30 wt-%, or greater than 40 wt-%, or greater than 50 wt-%, based on the total weight of a concentrated composition. A preferred concentrated composition includes 50 wt-% solids.

Compositions of the present disclosure may be provided in a variety of viscosities. Thus, for example, the viscosity may vary from a water-like thinness to a paste-like heaviness. They may also be provided in the form of gels, solids, or powders.

A composition of the present disclosure may be applied to a metallic surface using a variety of techniques, including, for example, spraying, brushing, rolling, dipping, knife-coating, die-coating, or combinations thereof. For cleaning a surface, contaminants may be removed by one of these methods, or additional wiping or scrubbing may be needed. The composition may be dried and hardened (and optionally cured) by simply letting the water evaporate, or by the application of heat, radiation, or a combination thereof.

Metallic surfaces refer to those surfaces that include elemental metals or alloys of metals and/or surface oxides of such metallic surfaces. Examples include stainless steel, aluminum, anodized aluminum, copper, titanium, zinc, silver, chromium, a surface oxide thereof, or combinations thereof (such as alloys, e.g., brass).

The present disclosure also provides articles that include a metallic surface. Examples of such articles include those in a home or commercial kitchen (e.g., refrigerator, dishwasher, stove, oven, microwave, exhaust hoods, fryers, grease traps, food-preparation tables, cabinets), in a restroom (e.g., toilet stall partitions, urinal partitions). Examples of such articles also include decorative or functional wall cladding such as in/on an elevator or escalator, walls in airports, hospitals, subway stations, train stations, malls, or in other commercial buildings. Examples of such articles also include decorative or functional panels in an automobile (e.g., decorative metallic parts in a car interior). Examples of such articles include consumer electronics, such as metal cases for electronic article (e.g., phones, tablets, and computers). Examples of such articles also include manufacturing equipment, and tools.

In one embodiment, an article is provided that includes a metallic surface having an aqueous (e.g., uncured) coating composition of the present disclosure disposed thereon. In another embodiment, an article is provided that includes a metallic surface having a coating disposed thereon, wherein the coating is applied by a method of the present disclosure. In another embodiment, an article is provided that includes a metallic surface having a hardened coating disposed thereon, wherein the hardened coating includes: a zwitterionic polymer; and an inorganic silicate; wherein the hardened coating is attached to the surface associatively, and is hydrophilic (i.e., with an advancing water contact angle of less than 45 degrees, or preferably less than 30 degrees, or less than 10 degrees).

A typical hardened coating is less than 1000 nm thick, or less than 500 nm thick, or less than 200 nm thick, or less than 100 nm thick, or less than 50 nm thick, or less than 10 nm thick.

Zwitterionic Polymer

Compositions of the present disclosure include a zwitterionic polymer that includes pendant zwitterionic moieties. In some embodiments, such polymers are homopolymers and are derived from one type of zwitterionic monomer. In some embodiments, such polymers are copolymers and are derived from two or more types of zwitterionic monomer.

In the context of the present disclosure, the term "pendant group" is meant to refer to an offshoot, which is neither oligomeric nor polymeric, from a polymeric (backbone) chain. In the context of the present disclosure, the expression "zwitterionic moiety" is meant to designate a moiety including both cationic and anionic groups, or corresponding simultaneously ionizable groups.

In certain embodiments, the zwitterionic polymer includes:
 a) repeating monomeric units including a pendant zwitterionic moiety; and
 b) optionally, secondary repeating monomeric units including a pendant group including a functional group selected from the group consisting of phosphate groups, phosphonate groups, sulfonate groups, alkoxysilane groups, carboxylate groups, and any combinations thereof;

and wherein the repeating monomeric units of the zwitterionic polymer independently include an ethylenically unsaturated polymerizable group selected from the group of (meth) acrylate ester containing groups.

In certain embodiments, the zwitterionic polymer of the present disclosure includes, as a first technical feature, repeating monomeric units including a pendant zwitterionic moiety. Zwitterionic moieties for use herein are not particularly limited. Any zwitterionic moiety known in the art may be used in the context of the present disclosure. Suitable zwitterionic moieties for use herein will be easily identified by those skilled in the art, in the light of the present description.

In a particular aspect of the present disclosure, the zwitterionic moiety for use herein includes functional groups selected from the group consisting of sulfonate groups, sulfate groups, phosphonate groups, phosphate groups, carboxylate groups, quaternary ammonium groups, sulfonium groups, phosphonium groups, and any combinations thereof.

In another particular aspect, the zwitterionic moiety for use herein includes a positively charged group selected from quaternary ammonium groups, sulfonium groups, phosphonium groups; and a negatively charged group selected from sulfonate groups, sulfate groups, phosphonate groups, phosphate groups, carboxylate groups.

According to a preferred aspect of the zwitterionic polymer of the present disclosure, the zwitterionic moiety includes a positively charged group selected from quaternary ammonium groups, and a negatively charged group selected from sulfonate groups and phosphate groups.

According to an advantageous aspect, the zwitterionic moiety for use herein includes a positively charged group selected from quaternary ammonium groups, and a negatively charged group selected from sulfonate groups.

According to another advantageous aspect, the zwitterionic moiety for use herein includes a positively charged group selected from quaternary ammonium groups, and a negatively charged group selected from phosphate groups.

In a preferred aspect of the present disclosure, the monomeric units including a pendant zwitterionic moiety for use herein have the general formula (I):

X—A—Y—B—Z  (I)

wherein:

X is an ethylenically unsaturated polymerizable group selected from the group of (meth)acrylate ester containing groups;

A and B are linking groups, which are the same or different moieties, and which are independently selected from the group of alkylene or oxyalkylene groups; and Y and Z are interchangeably the positively charged group or the negatively charged group of the zwitterionic moieties.

In another preferred aspect of the present disclosure, the monomeric units including a pendant zwitterionic moiety for use herein have the general formula (I), wherein:

X is an ethylenically unsaturated polymerizable group selected from the group of (meth)acrylate ester containing groups;

A and B are independently selected from the group of alkylene groups, in particular alkylene groups including from 1 to 8 carbon atoms, from 1 to 6 carbon atoms, or even from 1 to 4 carbon atoms; and Y and Z are interchangeably selected from the group consisting of sulfonate groups, sulfate groups, phosphonate groups, phosphate groups, carboxylate groups, quaternary ammonium groups, sulfonium groups, phosphonium groups, and any combinations thereof.

In still another preferred aspect of the present disclosure, the monomeric units including a pendant zwitterionic moiety for use herein have the general formula (I), wherein:

X is an ethylenically unsaturated polymerizable group selected from the group of (meth) acrylate ester containing groups;

A and B are independently selected from the group of alkylene groups including from 1 to 6 carbon atoms, or even from 1 to 4 carbon atoms; and Y and Z are interchangeably selected from the group consisting of sulfonate groups, phosphonate groups, and quaternary ammonium groups.

According to a more preferred aspect, the monomeric units including a pendant zwitterionic moiety for use herein have the general formula (I), wherein:

X is an ethylenically unsaturated polymerizable group selected from the group of (meth)acrylate ester containing groups;

A and B are independently selected from the group of alkylene groups including from 1 to 4 carbon atoms;

Y is selected from the group consisting of ammonium groups; and

Z is selected from the group consisting of sulfonate groups.

According to another more preferred aspect, the monomeric units including a pendant zwitterionic moiety for use herein have the general formula (I), wherein:

X is an ethylenically unsaturated polymerizable group selected from the group of (meth) acrylate ester containing groups;

A and B are independently selected from the group of alkylene groups including from 1 to 4 carbon atoms;

Y is selected from the group consisting of phosphate groups; and

Z is selected from the group consisting of ammonium groups.

According to an even more preferred aspect, the monomeric units including a pendant zwitterionic moiety is selected from the group consisting of 2-(N-3-sulfopropyl-N,N-dialkylammonium) ethyl acrylate, 2-(N-3-sulfobutyl-N,N-dialkylammonium) ethyl acrylate and 2-methacryloyloxyethyl phosphorylcholine.

According to a very preferred aspect of the present disclosure, the monomeric units including a pendant zwitterionic moiety is selected from the group consisting of 2-(N-3-sulfopropyl-N,N-dimethylammonium) ethyl acrylate and 2-methacryloyloxyethyl phosphorylcholine.

Exemplary monomerss include pendant zwitterionic moieties having formulas (II) and/or (III) below:

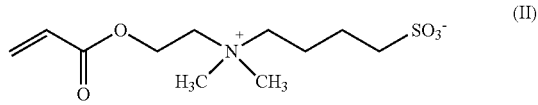

(II)

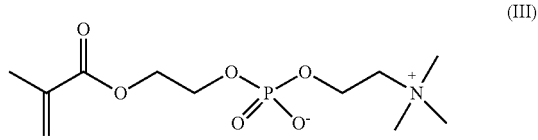

(III)

According to a particular execution of the present disclosure, the zwitterionic polymer may, optionally, include secondary repeating monomeric units including a pendant group including a functional group selected from the group consisting of phosphate groups, phosphonate groups, sulfonate groups, alkoxysilane groups, carboxylate groups, and any combinations thereof.

Without wishing to be bound by theory, it is believed the repeating pendant functional groups selected from the group consisting of phosphate groups, phosphonate groups, sulfonate groups, alkoxysilane groups and carboxylate groups, provide anchoring groups which advantageously improve the surface anchoring with the treated substrate.

In an advantageous aspect of the zwitterionic polymer, the optional secondary repeating monomeric units including pendant groups including a functional group selected from the group consisting of phosphate groups and alkoxysilane groups.

Advantageous alkoxysilane groups for use herein include, but are not limited to, those having the formula $Si(OR)_3$, wherein R is independently hydrogen or an alkyl group having 1 to 4 carbon atoms. Preferably, the alkoxysilane groups for use herein are selected from the group of trimethoxysilyl and triethoxysilyl.

According to one preferred aspect of the present disclosure, the secondary repeating monomeric unit including a pendant group including a functional group is selected to be 3-(trimethoxysilyl)propylmethacrylate.

According to another preferred aspect of the present disclosure, the secondary repeating monomeric unit including a pendant group including a functional group is selected to be 2-(methacryloyloxy)ethyl phosphate.

In the context of the present disclosure, but without wishing to be bound by theory, it is believed that improved mechanical durability of the coating may also be obtained on metallic substrates, in particular stainless steel while using secondary repeating monomeric units including pendant groups including a functional group selected from the group of phosphate groups.

The zwitterionic polymer of the present disclosure is further characterized in that the repeating monomeric units of the zwitterionic polymer independently include an ethylenically unsaturated polymerizable group selected from the group of (meth)acrylate ester containing groups. In a preferred aspect, the repeating monomeric units of the zwitterionic polymer independently include an ethylenically unsaturated polymerizable group selected from the group of acrylate ester containing groups. In a typical aspect, the ethylenically unsaturated polymerizable groups of the repeating monomeric units are designed to form the backbone of the zwitterionic polymer upon suitable polymerization reaction.

According to a typical aspect, the zwitterionic polymer of the present disclosure is non-crosslinked. Advantageously, crosslinking of the zwitterionic polymer is not required for it to provide the beneficial protecting properties to the treated surface. Accordingly, in an advantageous aspect, the zwitterionic polymer of the present disclosure is free of any crosslinking monomeric units.

Zwitterionic polymers described herein may generally be prepared according to any conventional method, well known to those skilled in the art, such as those disclosed in U.S. Pat. No. 8,680,038.

In some embodiments, compositions of the present disclosure include a zwitterionic polymer in an amount of at least 0.2 weight percent (wt-%), or at least 0.4 wt-%, based on the total weight of a ready-to-use composition. In some embodiments, compositions of the present disclosure include a zwitterionic polymer in an amount of up to 1.8 wt-%, or up to 1.6 wt-%, or up to 1.4 wt-%, or up to 1.2 wt-%, or up to 1.0 wt-%, or up to 0.8 wt-%, based on the total weight of a ready-to-use composition.

In some embodiments, compositions of the present disclosure include a zwitterionic polymer in an amount of at least 5 weight percent (wt-%), based on the total weight of a concentrated composition. In some embodiments, compositions of the present disclosure include a zwitterionic polymer in an amount of up to 45 wt-%, or up to 20 wt-%, based on the total weight of a concentrated composition.

Inorganic Silicates

Coating compositions of the present disclosure include one or more inorganic silicates, which may provide enhanced durability to a coating through crosslinking, thereby providing protection to a metallic surface.

Examples of suitable inorganic silicates include lithium silicate, sodium silicate, potassium silicate, or combinations thereof. Although sodium and potassium silicates are often used in detergents, lithium silicates are generally undesirable because they are not easily redissolved in water once dried, as opposed to sodium silicates which are able to be redissolved in water (see, e.g., U.S. Pat. No. 3,459,500). In the coating compositions of the present disclosure, however, this is not a problem because the desire is to provide a protective coating that is not easily removed by water. Thus, in certain embodiments, lithium silicate is a preferred silicate.

In some embodiments, the inorganic silicate has a $SiO_2/M_2O$ ratio within a range of 3.5 to 7.5. In some embodiments, the inorganic silicate has a $SiO_2/M_2O$ ratio within a range of 4.5 to 7.5.

In some embodiments, compositions of the present disclosure include an inorganic silicate in an amount of greater than 0 weight percent (wt-%), or at least 0.2 wt-%, or at least 0.4 wt-%, or at least 0.6 wt-%, or at least 0.8 wt-%, or at least 1.0 wt-%, or at least 1.2 wt-%, based on the total weight of a ready-to-use composition. In some embodiments, compositions of the present disclosure include an inorganic silicate in an amount of up to 1.8 wt-%, or up to 1.6 wt-%, or up to 1.4 wt-%, based on the total weight of a ready-to-use composition.

In some embodiments, compositions of the present disclosure include an inorganic silicate in an amount of at least 5 wt-%, or at least 20 wt-%, based on the total weight of a concentrated composition. In some embodiments, compositions of the present disclosure include an inorganic silicate in an amount of up to 45 wt, based on the total weight of a concentrated composition.

Optional Surfactants

Compositions of the present disclosure can also optionally include one or more surfactants. Surfactants are particularly desirable for use in compositions for cleaning and protecting.

A variety of surfactants may be used in a composition, such as anionic, nonionic, cationic, and zwitterionic surfactants. Suitable surfactants that may be used are commercially available from a number of sources. For a discussion of suitable surfactants, see Kirk-Othmer, Encyclopedia of Chemical Technology, Third Edition, volume 8, pages 900-912.

Nonionic surfactants include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the tradename PLURONIC (BASF-Wyandotte), and the like; and other like nonionic compounds. Silicone surfactants such as those available under the tradename ABIL B8852 can also be used.

Preferred surfactants are any of a broad variety of nonionic ethylene oxide (EO) containing surfactants. Many nonionic ethylene oxide derivative surfactants are water soluble and have cloud points below the intended use temperature of the compositions of the present disclosure. In addition, where the composition is preferred to be biodegradable, the defoamers are also selected to be biodegradable.

Some examples of ethylene oxide derivative surfactants that may be used in compositions of the present disclosure include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

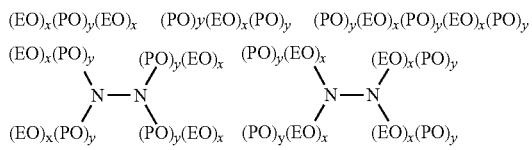

wherein EO represents an ethylene oxide group, PO represents a propylene oxide group, and x and y reflect the average molecular proportion of each alkylene oxide monomer in the overall block copolymer composition. In some embodiments, x is in the range of 10 to 130, y is in the range of 15 to 70, and x plus y is in the range of 25 to 200. It should be understood that each x and y in a molecule may be different. In some embodiments, the total polyoxyethylene component of the block copolymer may be at least 20 mole percent (mol-%) of the block copolymer and in some embodiments, at least 30 mol-% of the block copolymer. In some embodiments, the material may have a molecular weight greater than 400, and in some embodiments, greater than 500. For example, in some embodiments, the material may have a molecular weight in the range of 500 to 7000 or more, or in the range of 950 to 4000 or more, or in the range of 1000 to 3100 or more, or in the range of 2100 to 6700 or more.

Although the exemplary polyoxyethylene-polyoxypropylene block copolymer structures provided above have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that may be used according to the present disclosure may be characterized hetero-polyoxyethylene-polyoxypropylene block copolymers. Some examples of suitable block copolymer surfactants include commercial products such as those surfactants available under the tradenames PLURONIC and TETRONIC from BASF. For example, PLURONIC 25-R4 is one example of a useful block copolymer surfactant commercially available from BASF, that is biodegradable and GRAS (generally recognized as safe).

Suitable anionic surfactants include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionic surfactants include sodium alkylarylsulfonate, alpha-olefinsulfonate, and fatty alcohol sulfates.

Suitable cationic surfactants include, for example, amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant may be used to provide sanitizing properties.

Suitable zwitterionic surfactants include, for example, betaines, imidazolines, and propinates.

When a composition of the present disclosure includes a surfactant, it may be included in an amount of at least 0.001 wt-%, or at least 0.01 wt-%, or at least 0.1 wt-%, or at least 1 wt-%, or at least 2 wt-%, or at least 3 wt-%, based on the total weight of already-to-use composition. When a composition of the present disclosure includes a surfactant, it may be included in an amount of up to 10 wt-%, or up to 5 wt-%, or up to 3 wt-%, or up to 1 wt-%, based on the total weight of a ready-to-use composition.

When a composition of the present disclosure includes a surfactant, it may be included in an amount of at least 0.001 wt-%, or at least 1 wt-%, or at least 5 wt-%, or at least 10 wt-%, based on the total weight of a concentrated composition. When a composition of the present disclosure includes a surfactant, it may be included in an amount of up to 50 wt-%, or up to 20 wt-%, or up to 10 wt-%, or up to 5 wt-%, based on the total weight of a concentrated composition.

Optional Organic Solvents

Certain embodiments of compositions of the present disclosure may optionally include one or more organic solvents. These may be added to assist in solubilizing components and/or to enhance the cleaning capability of a composition.

Representative solvents and solvent systems may include one or more different solvents including acetone, aliphatic or aromatic alcohols, alkanol amines, ether amines, esters, and mixtures thereof. Representative solvents may include acetone, acetamidophenol, acetanilide, acetophenone, 2-acetyl-1-methylpyrrole, benzyl acetate, benzyl alcohol, methyl benzyl alcohol, alpha phenyl ethanol, benzyl benzoate, benzyloxyethanol, ethylene glycol phenyl ether (commercially available as DOWANOL EPh from Dow Chemical Co.), propylene glycol phenyl ether (commercially available as DOWANOL PPh from Dow Chemical Co.), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, 2-butoxy ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-I-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL from Dow Chemical Co.), ethyl 3-ethoxypropionate (commercially available as UCAR Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate.

In some embodiments, if an organic solvent is included, compositions of the present disclosure include alcohol and/or other organic solvents in an amount of at least 0.01 weight percent (wt-%), and often at least 2 wt-%, based on the total weight of a ready-to-use composition. In some embodiments, compositions of the present disclosure include alcohol and/or other organic solvents in an amount of up to 50 wt-%, and often up to 25 wt-%, based on the total weight of a ready-to-use composition.

When a composition of the present disclosure includes an organic solvent, alcohol and/or other organic solvents may be included in an amount of at least 1 weight percent (wt-%), and often at least 10 wt-%, based on the total weight of a concentrated composition. When a composition of the present disclosure includes an organic solvent, alcohol and/or other organic solvents may be included in an amount of up to 90 wt-%, and often up to 60 wt-%, based on the total weight of a concentrated composition.

Optional Alkalinity Sources

Certain embodiments of compositions of the present disclosure may optionally include one or more alkalinity (i.e., alkaline) sources.

Examples of suitable alkaline sources for use in the compositions according to the present disclosure include amines, alkanol amines, carbonates, and silicates. For example, the source of alkalinity can include sodium silicate, sodium metasilicate, sodium orthosilicate, sodium phosphate, sodium polyphosphate, sodium borate, sodium carbonate, potassium silicate, potassium metasilicate, potassium orthosilicate, potassium phosphate, potassium polyphosphate, potassium borate, potassium carbonate, lithium silicate, lithium metasilicate, lithium orthosilicate, lithium phosphate, lithium polyphosphate, lithium borate, lithium carbonate, 2-(2-aminoethoxy) ethanol, monoethanolamine, diethanolamine, triethanolamine, mixed isopropanolamines, morpholine, n,n-dimethyl ethanolamine, and combinations thereof.

When a composition of the present disclosure includes an alkalinity source, it may be included in an amount of at least 0.01 wt-%, or at least 1 wt-%, or at least 5 wt-%, based on the total weight of a concentrated composition. When a composition of the present disclosure includes an alkalinity source, it may be included in an amount of up to 40 wt-%, or up to 30 wt-%, or up to 10 wt-%, based on the total weight of a concentrated composition.

Optional Water Conditioning Agents

Certain embodiments of compositions of the present disclosure may optionally include one or more water conditioning agents. Water conditioning agents aid in removing metal compounds and in reducing harmful effects of hardness components in service water.

Exemplary water conditioning agents include chelating agents, sequestering agents, and inhibitors. Polyvalent metal cations or compounds such as a calcium, a magnesium, an iron, a manganese, a molybdenum, etc., cation or compound, or mixtures thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients including the nonionic surfactants and anionic surfactants of the present disclosure. Both organic and inorganic water conditioning agents are common and can be used. Inorganic water conditioning agents include such compounds as sodium tripolyphosphate and other higher linear and cyclic polyphosphates species. Organic water conditioning agents include both polymeric and small molecule water conditioning agents. Organic small molecule water conditioning agents are typically organocarboxylate compounds or organophosphate water conditioning agents. Polymeric inhibitors commonly include polyanionic compositions such as polyacrylic acid compounds. Small molecule organic water conditioning agents include, but are not limited to, sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium, and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N N-diacetic acid trisodium salt (MGDA), and iminodisuccinate sodium salt (IDS). Suitable water conditioning agents are commercially available.

When a composition of the present disclosure includes a water conditioning agent, it may be included in an amount of at least 0.01 wt-%, or at least 0.1 wt-%, or at least 1 wt-%, based on the total weight of a concentrated composition. When a composition of the present disclosure includes a water conditioning agent, it may be included in an amount of up to 40 wt-%, or up to 20 wt-%, or up to 10 wt-%, or up to 5 wt-%, based on the total weight of a concentrated composition.

Optional Bleaching Agents

Certain embodiments of compositions of the present disclosure may optionally include one or more bleaching agents. Bleaching agents may be included for lightening or whitening a substrate.

Examples of suitable bleaching agents include bleaching compounds capable of liberating an active halogen species (such as $Cl_2$, Bra, $OCl^-$, and/or $OBr^-$) under conditions typically encountered during the cleansing process. Suitable bleaching agents for use in the present compositions include, for example, chlorine-containing compounds such as a chlorine, a hypochlorite, and chloramine. Exemplary halogen-releasing compounds include the alkali metal dichloroisocyanurates, chlorinated trisodium phosphate, the alkali metal hypochlorites, monochloramine and dichloramine, and the like. Encapsulated chlorine sources may also be used to enhance the stability of the chlorine source in the composition (see, for example, U.S. Pat. No. 4,830,773 (Olson)). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like.

When a composition of the present disclosure includes a bleaching agent, it may be included in an amount of at least 0.1 wt-%, or at least 1 wt-%, or at least 3 wt-%, based on the total weight of a concentrated composition. When a composition of the present disclosure includes a bleaching agent, it may be included in an amount of up to 60 wt-%, or up to 20 wt-%, or up to 8 wt-%, or up to 6 wt-%, based on the total weight of a concentrated composition.

Other Optional Additives

Certain embodiments of compositions of the present disclosure may optionally include one or more other additives. Suitable additives according to the present disclosure may include, for example, dyes (product safety/identification), fragrances, corrosion inhibitors, enzymes, and/or thickeners. Suitable thickeners may include, for example, gums (e.g., xanthan, carrageenan, etc.), polymers (e.g., polyacrylates and similar modified polymers), and inorganic particles (e.g., clay silicates such as LAPONITE).

Various additional additives suitable for use according to the present disclosure are disclosed in U.S. Pat. Nos. 6,916,773 (Griese et al.) and 8,772,215 (Ryther et al.), and U.S. Pat. App. Pub. Nos. 2010/0317559 (Ryther et al.), 2012/0295829 (Peitersen et al.), and 2013/0023458 (Hodge et al.).

Illustrative Embodiments

Embodiment 1 is a coating composition comprising: a zwitterionic polymer comprising pendant zwitterionic moieties (in certain embodiments, a homopolymer); an inorganic silicate (in certain embodiments, a lithium silicate); and water.

Embodiment 2 is the composition of embodiment 1 wherein the inorganic silicate is an alkali metal silicate.

Embodiment 3 is the composition of embodiment 2 wherein the alkali metal silicate is selected from lithium silicate, sodium silicate, potassium silicate, or a combination thereof.

Embodiment 4 is the composition of embodiment 3 wherein the alkali metal silicate is lithium silicate.

Embodiment 5 is the composition of any one of embodiments 1 through 4 wherein the inorganic silicate comprises a $SiO_2/M_2O$ ratio within a range of 3.5 to 7.5.

Embodiment 6 is the composition of embodiment 5 wherein the inorganic silicate comprises a $SiO_2/M_2O$ ratio within a range of 4.5 to 7.5.

Embodiment 7 is the composition of any one of embodiments 1 through 6 wherein the inorganic silicate is present in an amount of 0.2 wt-% to 1.8 wt-% (or 1.2 wt-% to 1.8 wt-%), based on the total weight of a ready-to-use coating composition.

Embodiment 8 is the composition of any one of embodiments 1 through 7 wherein the zwitterionic moieties comprise functional groups selected from the group consisting of sulfonate groups, sulfate groups, phosphonate groups, phosphate groups, carboxylate groups, quaternary ammonium groups, sulfonium groups, phosphonium groups, and any combinations thereof.

Embodiment 9 is the composition of embodiment 8 wherein the zwitterionic moieties comprise a positively charged group selected from quaternary ammonium groups, sulfonium groups, phosphonium groups; and a negatively charged group selected from sulfonate groups, sulfate groups, phosphonate groups, phosphate groups, carboxylate groups.

Embodiment 10 is the composition of embodiment 9 wherein the zwitterionic moieties comprise a positively charged group selected from quaternary ammonium groups, and a negatively charged group selected from sulfonate groups and phosphate groups.

Embodiment 11 is the composition of embodiment 9 wherein the zwitterionic moieties comprise a positively charged group selected from quaternary ammonium groups, and a negatively charged group selected from sulfonate groups.

Embodiment 12 is the coating composition of any one of embodiments 1 through 11 wherein the zwitterionic polymer is present in an amount of 0.2 wt-% to 1.8 wt-% (or 0.2 wt-% to 0.8 wt-%), based on the total weight of a ready-to-use coating composition.

Embodiment 13 is the coating composition of any one of embodiments 1 through 12 wherein the zwitterionic polymer and inorganic silicate are present in the coating composition in a weight ratio of 10:90 to 90:10 (or in a weight ratio of 10:90 to 40:60).

Embodiment 14 is the coating composition of any one of embodiments 1 through 13 further comprising a surfactant.

Embodiment 15 is the coating composition of any one of embodiments 1 through 14 which provides protection to a metallic surface.

Embodiment 16 is the coating composition of claim 15 which provides protection to a stainless steel surface.

Embodiment 17 is a method of protecting a metallic surface, the method comprising:
providing a coating composition of any one of embodiments 1 through 14, which may be concentrated or a ready-to-use composition;
optionally, diluting the coating composition, if concentrated, to a ready-to-use composition;
applying the ready-to-use composition to a metallic surface; and
allowing the ready-to-use composition to dry on the metallic surface.

Embodiment 18 is the method of embodiment 17 wherein the metallic surface comprises stainless steel, aluminum, anodized aluminum, titanium, zinc, silver, chromium, a surface oxide thereof, or a combination thereof.

Embodiment 19 is the method of embodiment 18 wherein the metallic surface comprises a stainless steel surface.

Embodiment 20 is a method of cleaning and protecting a metallic surface having contaminants thereon, the method comprising:
providing a coating composition of embodiment 14, which may be concentrated or a ready-to-use composition;
optionally, diluting the coating composition, if concentrated, to a ready-to-use composition;
applying the ready-to-use composition to the metallic surface under conditions effective to remove contaminants from the metallic surface; and
allowing the ready-to-use composition to dry on the metallic surface.

Embodiment 21 is the method of embodiment 20 wherein the metallic surface comprises stainless steel, aluminum, anodized aluminum, titanium, zinc, silver, chromium, a surface oxide thereof, or a combination thereof.

Embodiment 22 is the method of embodiment 21 wherein the metallic surface comprises a stainless steel surface.

Embodiment 23 is an article comprising a metallic surface having the coating composition of any one of embodiments 1 through 16 disposed thereon.

Embodiment 24 is the article of embodiment 23 wherein the metallic surface comprises a stainless steel surface.

Embodiment 25 is an article comprising a metallic surface having a coating disposed thereon, wherein the coating is applied by the method of any one of embodiments 17 through 19.

Embodiment 26 is an article comprising a metallic surface having a coating disposed thereon, wherein the coating is applied by the method of any one of embodiments 20 through 22.

Embodiment 27 is an article comprising a metallic surface having a hardened coating disposed thereon; wherein the hardened coating is hydrophilic and comprises: a zwitterionic polymer comprising pendant zwitterionic pendant groups (in certain embodiments, a zwitterionic homopolymer); and an inorganic silicate (in certain embodiments a lithium silicate); wherein the hardened coating is attached to the metallic surface associatively.

Embodiment 28 is the article of embodiment 27 wherein the metallic surface comprises stainless steel, aluminum, anodized aluminum, titanium, zinc, silver, chromium, a surface oxide thereof, or a combination thereof.

Embodiment 29 is the article of embodiment 28 wherein the metallic surface comprises a stainless steel surface.

Embodiment 30 is the article of embodiment 29 wherein the stainless steel surface forms at least a portion of a refrigerator, dishwasher, stove, oven, microwave, exhaust hood, fryer, grease trap, food-preparation table, cabinet, toilet stall partition, urinal partition, decorative or functional wall cladding in or on an elevator or escalator, wall in a commercial building, decorative or functional panel in an automobile, metal case for an electronic article, piece of manufacturing equipment, or tool.

EXAMPLES

Objects and advantages of various embodiments of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Poly(2-(N-3-sulfobutyl-N,N-dialkylammonium) ethylacrylate) (Zwitterionic polymer, Zwit-Polymer). One gram (1 g; 0.007 mol) of N,N-dimethylaminoethyl acrylate (available from Sigma-Aldrich, Germany) was dissolved in 9 g of tetrahydrofuran (THF, available from Sigma-Aldrich, Germany). After purging the solution with nitrogen, 0.010 g of azoisobutyronitrile (AIBN, available from Sigma-Aldrich, Germany) was added and the reaction mixture was stirred at 80° C. for 3 hours under nitrogen atmosphere. After the addition of 0.9 g (0.007 mol) of 1,4-butane sultone (available from Sigma-Aldrich, Germany), the mixture was stirred for 2 hours at 80° C., allowed to cool to room temperature and stirred overnight, before the solvent was removed under vacuum.

LSS-35, LSS-45, LSS-75, aqueous lithium silicate solutions (21-24% actives), were obtained from Nissan Chemical America Corporation, Houston, Tex.

Sunflower oil under trade name of TiP available from Real (supermarket), Germany.

Oil Red O, 1-[2,5-Dimethyl-4-(2,5-Dimethylphenylazo) Phenylazo]-2-Naphthol, available from Sigma-Aldrich, Germany.

Stainless steel substrates, type 1.4301 (AISI type 304), brushed surface finish (150×50×1 mm) available from Rocholl GmbH, Germany.

Isopropanol (IPA), available from Sigma-Aldrich, Germany.

Potassium Hydroxide (KOH), available from Merck, Germany.

TABER Reciprocating Abraser—Model 5900 equipped with the Taber Crockmeter Kit available from Taber Industries, North Tonawanda, N.Y., USA.

Contact Angle Measuring System, Model OCA 15Pro available from DataPhysics Instruments GmbH, Filderstadt, Germany.

Preparatory Example Solution Preparation

The coating solutions were prepared by dissolving the zwitterionic polymer (Zwit-Polymer) at room temperature in the appropriate amount of deionized water under stirring. The different lithium silicate solutions (LSS) were added under continued stirring. Finally, the combined solutions were stirred for 15 minutes prior to coating onto the substrates. Solutions were prepared varying the solid weight ratio of zwitterionic polymer to lithium silicate (Zwit-Polymer/LSS). An overview of the Preparatory Examples can be found in Table 1.

TABLE 1

| Preparatory Example | LSS Type | Zwit-Polymer/LSS Ratio | Total Weight % Solids (wt %) | Total Amount Prepared (g) | Amount Zwit-Polymer (g) | Amount LSS (g) | Amount Deionized Water (g) |
|---|---|---|---|---|---|---|---|
| PE1 | LSS-35 | 0/100 | 2 | 10 | 0.00 | 0.83 | 9.17 |
| PE2 | LSS-45 | 0/100 | 2 | 10 | 0.00 | 0.87 | 9.13 |
| PE3 | LSS-75 | 0/100 | 2 | 10 | 0.00 | 0.92 | 9.08 |
| PE4 | — | 100/0 | 2 | 10 | 0.20 | 0.00 | 9.80 |
| PE5 | LSS-35 | 30/70 | 2 | 10 | 0.06 | 0.58 | 9.36 |
| PE6 | LSS-45 | 30/70 | 2 | 10 | 0.06 | 0.61 | 9.33 |
| PE7 | LSS-75 | 30/70 | 2 | 10 | 0.06 | 0.64 | 9.30 |
| PE8 | LSS-35 | 30/70 | 1 | 10 | 0.03 | 0.29 | 9.68 |
| PE9 | LSS-45 | 30/70 | 1 | 10 | 0.03 | 0.30 | 9.67 |
| PE10 | LSS-75 | 30/70 | 1 | 10 | 0.03 | 0.32 | 9.65 |
| PE11 | LSS-35 | 50/50 | 2 | 10 | 0.10 | 0.42 | 9.48 |
| PE12 | LSS-45 | 50/50 | 2 | 10 | 0.10 | 0.43 | 9.47 |
| PE13 | LSS-75 | 50/50 | 2 | 10 | 0.10 | 0.46 | 9.44 |
| PE14 | LSS-35 | 70/30 | 2 | 10 | 0.14 | 0.25 | 9.61 |
| PE15 | LSS-45 | 70/30 | 2 | 10 | 0.14 | 0.26 | 9.60 |
| PE16 | LSS-75 | 70/30 | 2 | 10 | 0.14 | 0.28 | 9.58 |
| PE17 | LSS-35 | 20/80 | 2 | 10 | 0.04 | 0.67 | 9.29 |
| PE18 | LSS-45 | 20/80 | 2 | 10 | 0.04 | 0.70 | 9.26 |
| PE19 | LSS-75 | 20/80 | 2 | 10 | 0.04 | 0.73 | 9.23 |
| PE20 | LSS-35 | 80/20 | 2 | 10 | 0.16 | 0.17 | 9.67 |
| PE21 | LSS-45 | 80/20 | 2 | 10 | 0.16 | 0.17 | 9.67 |
| PE22 | LSS-75 | 80/20 | 2 | 10 | 0.16 | 0.18 | 9.66 |

Comparative Examples C1-C6 and Examples E1-E24

Substrate Preparation and Coating Application

The stainless steel substrates were cleaned by immersion in a KOH/IPA (50:50 volume % mixture, concentration (KOH)=1 mol/L) bath overnight, rinsing with copious amounts of deionized water and drying at room temperature.

The coating solution (PE 1-22) was dropped (3 drops) onto the substrate using a disposable pipette and evenly rubbed onto the surface in an up and down movement using a lint free tissue (34567 Cleaning Tissue, 3M, Germany). Residual water was allowed to evaporate. This coating procedure was repeated four more times. After 24 hours of curing at room temperature, the samples were investigated in oil challenge tests.

Sunflower Oil Removal Test

The samples from Examples E1-E18 and Comparative Examples C1-C5 were tested for their cleanability (removal of sunflower oil) as well as the longevity of the coatings when subjected to repeated soiling tests. For the test, a drop of sunflower oil was applied to the coated surfaces of samples from Examples E1-E18 and Comparative Examples C1-C5, the samples were allowed to stand for a period of time of less than 5 minutes at room temperature.

The sunflower oil was rinsed away with a defined volume (10-20 mL) of deionized water using a 10 mL disposable pipette. The rinsed substrates were blown dry with compressed air and visually inspected. If the sunflower oil was removed completely, the samples were subjected to the test again until the sunflower oil could not be removed any more in one rinsing cycle. The number of cycles were counted, in which the oil was removed completely. The durability and protecting performance of a coating composition was the better, the more rinsing cycles a sample could pass. For example, for Example 7, the oil was removed completely in 2 cycles. The results of these tests are shown in Table 2.

TABLE 2

| Example | Solution | Solution Details | Number of Possible Rinsing Cycles |
|---|---|---|---|
| C1 | none | Uncoated control substrate | <1 |
| C2 | PE1 | LSS-35, 2 wt % | 3 |
| C3 | PE2 | LSS-45, 2 wt % | 2 |
| C4 | PE3 | LSS-75, 2 wt % | 2 |
| C5 | PE4 | Zwit-Polymer, 2 wt % | 1 |
| E1 | PE5 | Zwit-Polymer/LSS-35 (30/70), 2 wt % | >5 |
| E2 | PE6 | Zwit-Polymer/LSS-45 (30/70), 2 wt % | >5 |
| E3 | PE7 | Zwit-Polymer/LSS-75 (30/70), 2 wt % | >5 |
| E4 | PE8 | Zwit-Polymer/LSS-35 (30/70), 1 wt % | 3 |
| E5 | PE9 | Zwit-Polymer/LSS-45 (30/70), 1 wt % | 1 |
| E6 | PE10 | Zwit-Polymer/LSS-75 (30/70), 1 wt % | 1 |
| E7 | PE11 | Zwit-Polymer/LSS-35 (50/50), 2 wt % | 2 |
| E8 | PE12 | Zwit-Polymer/LSS-45 (50/50), 2 wt % | 1 |
| E9 | PE13 | Zwit-Polymer/LSS-75 (50/50), 2 wt % | 1 |
| E10 | PE14 | Zwit-Polymer/LSS-35 (70/30), 2 wt % | 2 |
| E11 | PE15 | Zwit-Polymer/LSS-45 (70/30), 2 wt % | 1 |
| E12 | PE16 | Zwit-Polymer/LSS-75 (70/30), 2 wt % | <1 |
| E13 | PE17 | Zwit-Polymer/LSS-35 (20/80), 2 wt % | >5 |
| E14 | PE18 | Zwit-Polymer/LSS-45 (20/80), 2 wt % | >5 |
| E15 | PE19 | Zwit-Polymer/LSS-75 (20/80), 2 wt % | >5 |
| E16 | PE20 | Zwit-Polymer/LSS-35 (80/20), 2 wt % | 3 |
| E17 | PE21 | Zwit-Polymer/LSS-45 (80/20), 2 wt % | 2 |
| E18 | PE22 | Zwit-Polymer/LSS-75 (80/20), 2 wt % | <1 |

The data in Table 2 highlights that a coating composition comprising a zwitterionic polymer and lithium silicate can allow for repetitive removal of oil from coated stainless steel surfaces by rinsing with water.

Oil Film Removal Test

The "spot-clean" property was assessed for Examples 19-24 and Comparative Example C6. In this test, the coated stainless steel substrates were covered with an oil condensate film by placing them for 30 minutes on a crystallizing dish filled with sunflower oil, which was heated up to 200° C. The oil condensate film was clearly visible as a dark deposit on the surface. The coated and oil film stained substrates were then abraded with a wet cotton Crockmeter tissue using a TABER Reciprocating Abraser—Model 5900 equipped with the Crockmeter Kit. A 10 N weight and a velocity of 30 cycles/min were applied for 10 double rubs.

After abrasion, the outline of the abraded area was rated visually. When the outline of the abraded area was clearly visible, the abraded area itself was spotless and the color of the abraded area was the same compared to the color of the oil-free area, then the "spot-clean" property was assigned a high number. Rating: 4=abraded area with clear outline and without dark spots, 3=partially clear outline without dark spots, 2=abraded area with partially clear outline but dark spots, 1=abraded area unchanged. Results are shown in Table 3.

TABLE 3

| Example | Solution | Solution Details | Abraded Area Rating |
|---|---|---|---|
| C6 | none | Uncoated control substrate | 1 |
| E19 | PE5 | Zwit-Polymer/LSS-35 (30/70), 2 wt % | 4 |
| E20 | PE6 | Zwit-Polymer/LSS-45 (30/70), 2 wt % | 4 |
| E21 | PE7 | Zwit-Polymer/LSS-75 (30/70), 2 wt % | 3 |
| E22 | PE17 | Zwit-Polymer/LSS-35 (20/80), 2 wt % | 4 |
| E23 | PE18 | Zwit-Polymer/LSS-45 (20/80), 2 wt % | 4 |
| E24 | PE19 | Zwit-Polymer/LSS-75 (20/80), 2 wt % | 4 |

The data in Table 3 illustrates that a coating composition comprising a zwitterionic polymer and lithium silicate can allow for "spot-cleaning" of oil condensate film from coated stainless steel surfaces by wet wiping.

Stainless steel substrates coated only with lithium silicate at 2 wt-% (similar to C2, C3 and C4) were tested in oil abrasion tests. The results were similar to E20 in Table 3. However, an undesirable darker appearance of the stainless steel substrates was observed when lithium silicate was applied alone compared to applying the coatings comprising lithium silicate in combination with the zwitterionic polymer. Also, stainless steel substrates coated only with the zwitterionic polymer were not tested because a coating containing only the polymer is removed by rinsing with water and wet abrasion is an even more challenging test.

Contact Angle Measurements

The static water contact angles of samples from Examples E25 and E26 and Comparative Example C7 were determined using the Contact Angie Measuring System, Model OCA 15Pro available from DataPhysics Instruments Gmbh, Filderstadt, Germany. The contact angle measurement of a 3 μL water droplet (Millipore water) placed onto the coated substrate was performed using the sessile drop method with Young-Laplace fitting. The values reported are the average of at least 5 separate measurements. Results are shown in Table 4.

TABLE 4

| Example | Solution | Solution Details | Water Contact Angle (°) |
|---|---|---|---|
| C7 | none | Uncoated control substrate | 49 |
| E25 | PE6 | Zwit-Polymer/LSS-45 (30/70), 2 wt % | 13 |
| E26 | PE18 | Zwit-Polymer/LSS-45 (20/80), 2 wt % | 12 |

The results show that the coatings render a bare stainless steel surface hydrophilic, in agreement with the definition of a hydrophilic surface that refers to surfaces on which drops of water or aqueous solutions exhibit an advancing water contact angle of less than 45° as "hydrophilic".

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A coating composition comprising:
   a zwitterionic homopolymer comprising pendant zwitterionic moieties;
   a lithium silicate; and
   water;
   wherein the zwitterionic homopolymer and the lithium silicate are present in the coating composition in a weight ratio of 10:90 to 90:10.

2. The composition of claim 1 being free of a non-zwitterionic silane.

3. The composition of claim 1 wherein the lithium silicate is present in an amount of 0.2 wt-% to 1.8 wt-%, based on the total weight of a ready-to-use coating composition.

4. The composition of claim 1 wherein the zwitterionic moieties comprise functional groups selected from the group consisting of sulfonate groups, sulfate groups, phosphonate groups, phosphate groups, carboxylate groups, quaternary ammonium groups, sulfonium groups, phosphonium groups, and any combinations thereof.

5. The composition of claim 4 wherein the zwitterionic moieties comprise a positively charged group selected from quaternary ammonium groups, sulfonium groups, phosphonium groups; and a negatively charged group selected from sulfonate groups, sulfate groups, phosphonate groups, phosphate groups, carboxylate groups.

6. The composition of claim 1 wherein the zwitterionic homopolymer is present in an amount of 0.2 wt-% to 1.8 wt-%, based on the total weight of a ready-to-use coating composition.

7. A coating composition comprising:
   a zwitterionic polymer comprising pendant zwitterionic moieties;
   a lithium silicate; and
   water;
   wherein the zwitterionic polymer and the lithium silicate are present in the coating composition in a weight ratio of 10:90 to 90:10.

8. The composition of claim 7 wherein the lithium silicate comprises a $SiO_2/M_2O$ ratio within a range of 3.5 to 7.5.

9. The composition of claim 8 wherein the lithium silicate comprises a $SiO_2/M_2O$ ratio within a range of 4.5 to 7.5.

10. The composition of claim 7 further comprising a surfactant.

11. The composition of claim 7 being free of a non-zwitterionic silane.

12. The composition of claim 7 which provides protection to a stainless steel surface.

13. A method of protecting a metallic surface, the method comprising:
   providing a coating composition of claim 7, which may be concentrated or a ready-to-use composition;
   optionally, diluting the coating composition, if concentrated, to a ready-to-use composition;
   applying the ready-to-use composition to a metallic surface; and
   allowing the ready-to-use composition to dry on the metallic surface.

14. A method of cleaning and protecting a metallic surface having contaminants thereon, the method comprising:
   providing a coating composition of claim 10, which may be concentrated or a ready-to-use composition;
   optionally, diluting the coating composition, if concentrated, to a ready-to-use composition;
   applying the ready-to-use composition to the metallic surface under conditions effective to remove contaminants from the metallic surface; and
   allowing the ready-to-use composition to dry on the metallic surface.

15. The method of claim 14 wherein the metallic surface comprises stainless steel, aluminum, anodized aluminum, titanium, zinc, silver, chromium, a surface oxide thereof, or a combination thereof.

16. An article comprising a metallic surface having the coating composition of claim 1 disposed thereon.

17. An article comprising a stainless steel surface having a hardened coating disposed thereon; wherein the hardened coating is hydrophilic and comprises:
   a zwitterionic polymer comprising pendant zwitterionic moieties; and
   a lithium silicate;
   wherein the zwitterionic polymer and the lithium silicate are present in the hardened coating in a weight ratio of 10:90 to 90:10;
   wherein the hardened coating is attached to the stainless steel surface associatively.

18. The article of claim 17 wherein the stainless steel surface forms at least a portion of a refrigerator, dishwasher, stove, oven, microwave, exhaust hood, fryer, grease trap, food-preparation table, cabinet, toilet stall partition, urinal partition, decorative or functional wall cladding in or on an elevator or escalator, wall in a commercial building, decorative or functional panel in an automobile, metal case for an electronic article, piece of manufacturing equipment, or tool.

19. The article of claim 17 being free of a non-zwitterionic silane.

* * * * *